(12) United States Patent
Nakawaki

(10) Patent No.: US 9,094,222 B2
(45) Date of Patent: Jul. 28, 2015

(54) IMAGE PROCESSING APPARATUS INVOLVING MICROBLOGGING FUNCTION, CONTROL METHOD FOR THE SAME, AND PROGRAM

(75) Inventor: Jun Nakawaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 13/575,473

(22) PCT Filed: May 31, 2012

(86) PCT No.: PCT/JP2012/064614
§ 371 (c)(1),
(2), (4) Date: Jul. 26, 2012

(87) PCT Pub. No.: WO2012/169563
PCT Pub. Date: Dec. 13, 2012

(65) Prior Publication Data
US 2013/0073639 A1 Mar. 21, 2013

(30) Foreign Application Priority Data
Jun. 8, 2011 (JP) .................................. 2011-128644

(51) Int. Cl.
*G06F 15/16* (2006.01)
*H04L 12/18* (2006.01)
(Continued)

(52) U.S. Cl.
CPC ...... *H04L 12/1822* (2013.01); *G06F 17/30861* (2013.01); *H04L 67/22* (2013.01); *G06F 17/21* (2013.01); *G06F 17/27* (2013.01); *G06F 17/3089* (2013.01); *H04L 12/588* (2013.01)

(58) Field of Classification Search
CPC ..... G06Q 50/01; G06F 17/2785; G06F 17/21; G06F 17/27; G06F 17/30861; G06F 17/3089; H04L 12/588; H04L 51/32; H04L 67/22
USPC .......................................................... 709/206
See application file for complete search history.

(56) References Cited

U.S. PATENT DOCUMENTS 8,478,826 B2 * 7/2013 Erhart et al. .................. 709/206
2007/0047844 A1 * 3/2007 Watanabe et al. ............. 382/305
(Continued)

FOREIGN PATENT DOCUMENTS

| JP | 2000-10922 A | 1/2000 |
| JP | 2008-236702 A | 10/2008 |
| JP | 2009-157799 A | 7/2009 |

OTHER PUBLICATIONS

Japan Patent Office, International Search Report mailed on Sep. 11, 2012, in connection with International Application No. PCT/JP2012/064614 (2 pages).
(Continued)

*Primary Examiner* — Jeong S Park
(74) *Attorney, Agent, or Firm* — Fitzpatrick, Cella, Harper & Scinto

(57) ABSTRACT

A mechanism for reducing an operator's time and effort in image data distribution is provided. To accomplish this, an image processing apparatus, which is capable of communicating with a server that provides a microblogging function for publicizing a message registered by a user to other users, registers the first message with the server if image data is stored in a memory; monitors a second message newly registered with respect to the registered first message; analyzes the second message if the second message is detected; and transmits image data based on the result of the analysis.

12 Claims, 11 Drawing Sheets

(51) Int. Cl.
*H04L 29/08* (2006.01)
*G06F 17/30* (2006.01)
*G06F 17/21* (2006.01)
*H04L 12/58* (2006.01)
*G06F 17/27* (2006.01)

(56) References Cited

U.S. PATENT DOCUMENTS

| 2008/0056574 | A1* | 3/2008 | Heck | 382/177 |
| 2008/0189357 | A1* | 8/2008 | Prasad et al. | 709/203 |
| 2008/0204827 | A1 | 8/2008 | Yoshio et al. | |
| 2008/0222531 | A1* | 9/2008 | Davidson et al. | 715/736 |
| 2010/0123933 | A1* | 5/2010 | Takeda | 358/1.15 |
| 2012/0066212 | A1* | 3/2012 | Jennings | 707/723 |
| 2012/0216107 | A1* | 8/2012 | Iwabuchi | 715/231 |

OTHER PUBLICATIONS

Japan Patent Office, Written Opinion of the International Searching Authority mailed on Sep. 11, 2012, in connection with International Application No. PCT/JP2012/064614 (4 pages).

* cited by examiner

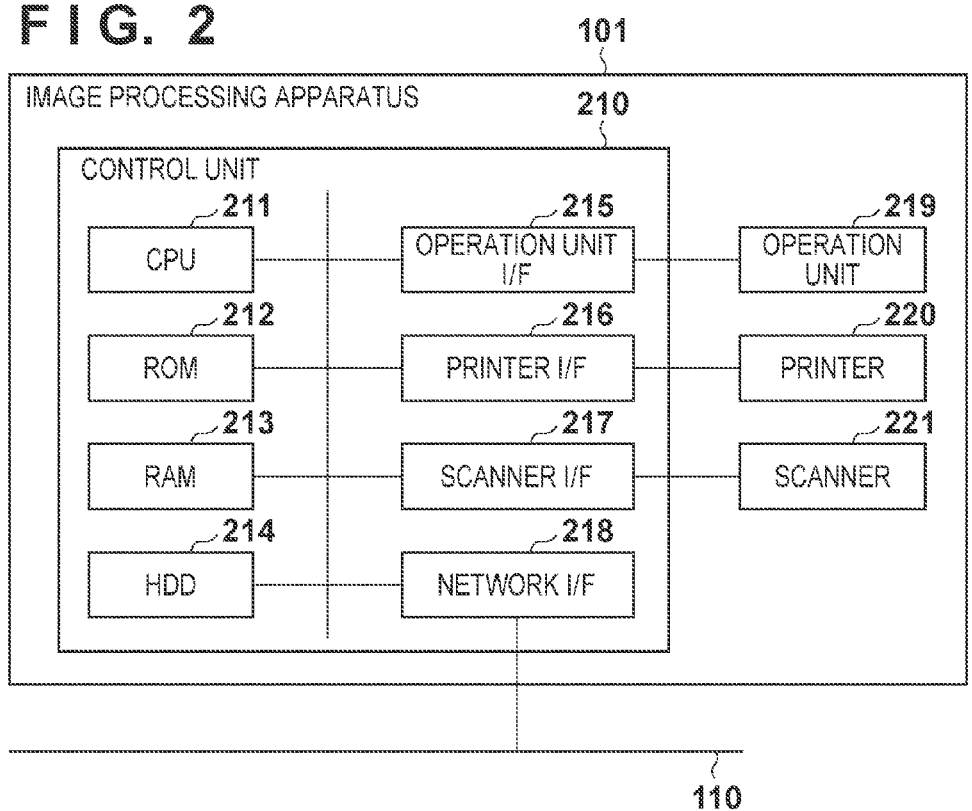
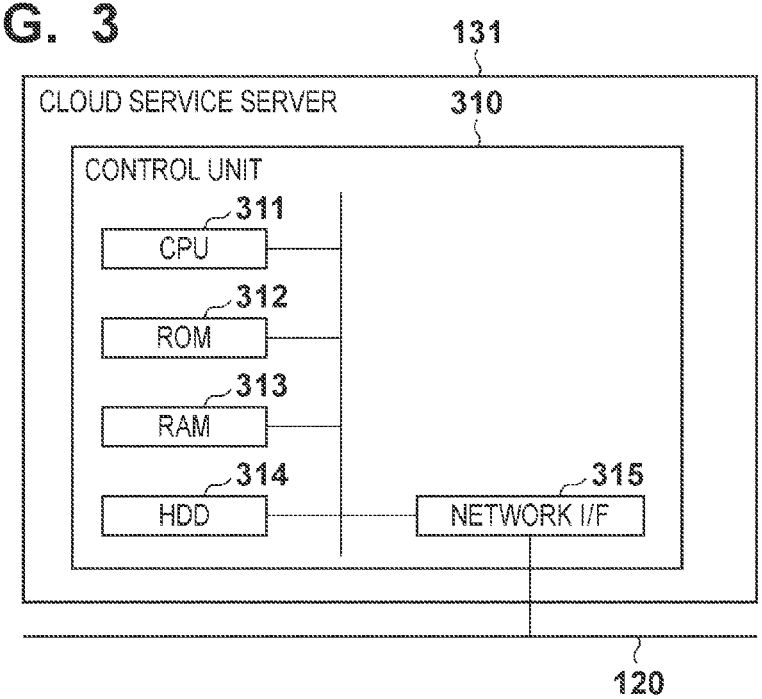

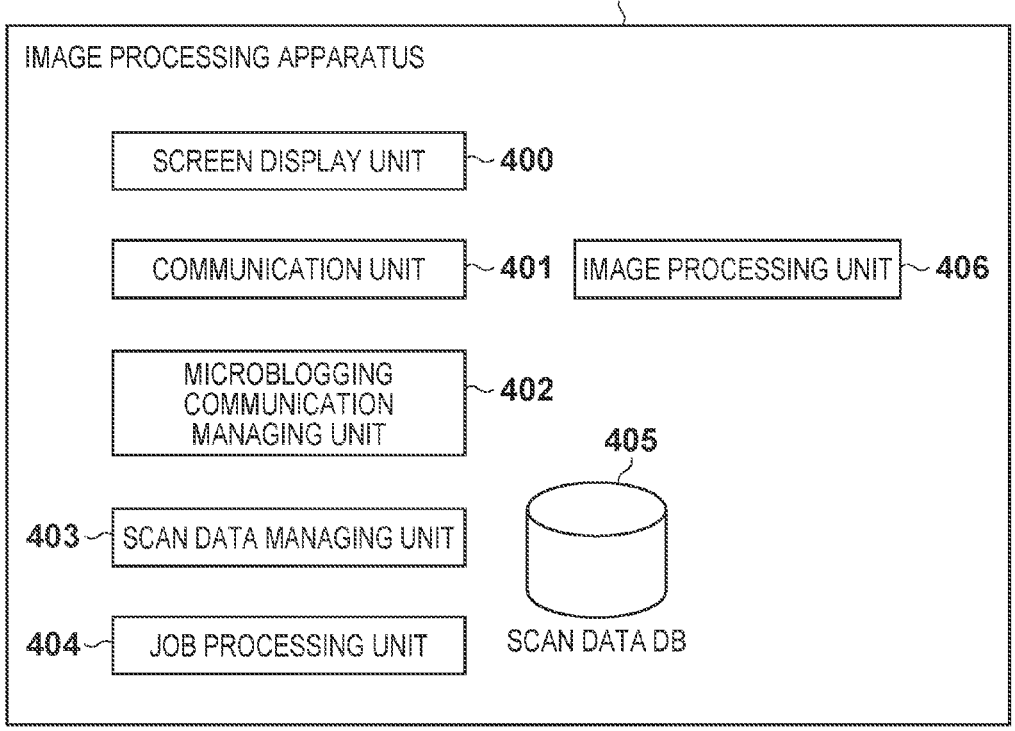

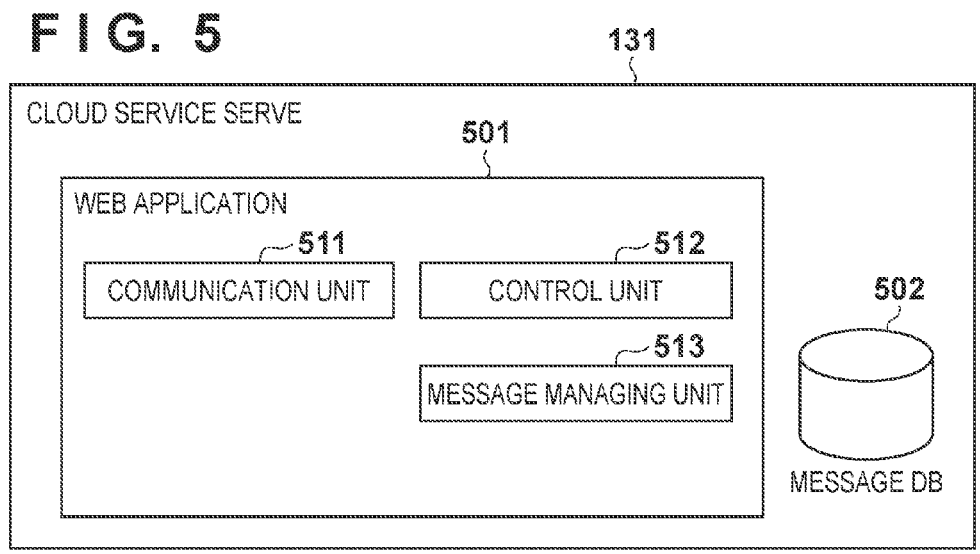
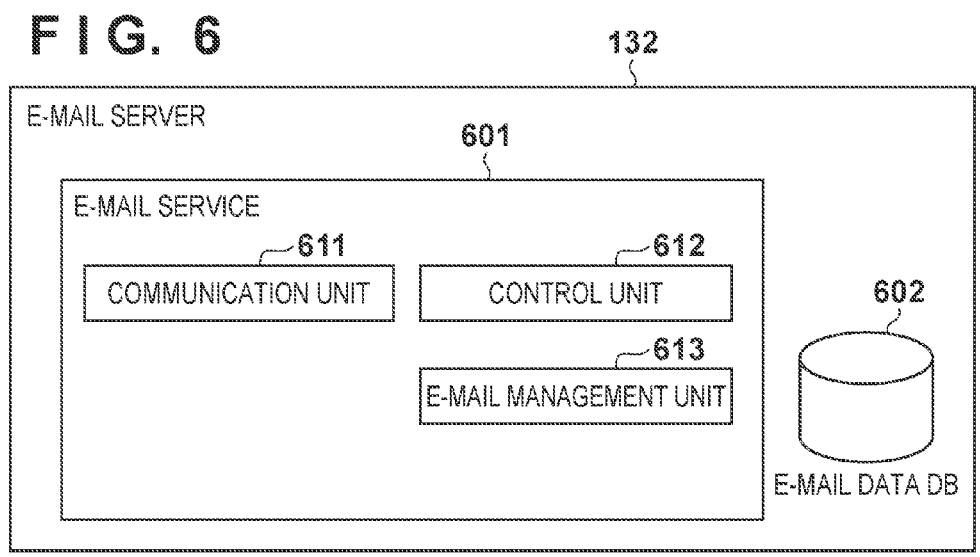

FIG. 12

| SCANNED DOCUMENT ID | SCANNED DOCUMENT TITLE | MESSAGE ID |
|---|---|---|
| 0001 | AA MEETING MINUTES | 147051 |
| 0002 | AA MEETING HANDOUTS | 825089 |
| 0003 | BB PROJECT TIMETABLE | 344583 |
| 0004 | CC APPLICATION FORM | 439097 |

| 1301 | 1302 |
|---|---|
| COMMAND CHARACTER STRING | PROCESSING FUNCTION |
| send | TRANSMITTING FUNCTION |
| print | PRINTING FUNCTION |

1300

| 1311 | 1312 |
|---|---|
| PROTOCOL CHARACTER STRING | PROCESSING FUNCTION |
| me | E-MAIL TRANSMITTING FUNCTION |
| email | E-MAIL TRANSMITTING FUNCTION |
| e-mail | E-MAIL TRANSMITTING FUNCTION |
| mail | E-MAIL TRANSMITTING FUNCTION |
| document | STORAGE FUNCTION OF STORING DATA IN THE CLOUD SERVICE SERVER 131 |

1310

| 1321 | 1322 |
|---|---|
| PARAMETER CHARACTER STRING | PROCESSING FUNCTION |
| pdf | PDF CONVERSION PROCESSING |
| xps | XPS CONVERSION PROCESSING |
| jpeg | JPEG CONVERSION PROCESSING |

1320

IMAGE PROCESSING APPARATUS INVOLVING MICROBLOGGING FUNCTION, CONTROL METHOD FOR THE SAME, AND PROGRAM

CROSS REFERENCE TO RELATED APPLICATIONS

The present application is a U.S. National Stage Entry of International Application No. PCT/JP2012/064614, filed May 31, 2012, which claims priority to Japan Patent Application No. 2011-128644, filed Jun. 8, 2011. The entire disclosure of each prior application is incorporated herein by reference.

TECHNICAL FIELD

The present invention relates to an image processing apparatus capable of communicating with a server that provides a microblogging function, a control method therefor, and a program.

BACKGROUND ART

In recent years, cloud computing systems have been put to practical use as a systematic mode of providing services using the Internet. Users who at least have an Internet connection can use services called "cloud services" provided by cloud computing systems, without the need of preparing hardware resources such as a server. The cloud services that have already been implemented include a CRM (Customer Relationship Management) service that provides CRM system functions for customer management and sales support. Other cloud services include a document management service that provides a storage and management function for storing and managing electronic files.

There is also a service that provides a microblogging function as a communication tool. The microblogging function is a concise blogging function with which a user who has an account for the service publicizes a short statement with about 100-200 characters called "mutters" as a "message" or "comment". The "users" referred to here are not limited to actual users (people), but also include objects or applications such as a printer or an associated service on the cloud service. Each "message" and "comment" publicized by a user is assigned a unique identifier. With the microblogging function, a "timeline" is created on which "comments" associated with a "message" registered by a user can be registered, displayed, and managed. The user who registers a "message" and other users exchange information and communicate with each other by registering associated information as "comments" on this "timeline". Each user account has a user profile management function, which allows a user to know some personal details of a person the user is communicating with. For example, information about a user name, contact information (e-mail address, telephone number, address, etc.), a group the user belongs to, and the like is managed.

Some CRM services provided as cloud services have the microblogging function as a communication tool used in business. Those cloud services further improve usability by linking customer information or business information to "messages" and "comments". At the same time, some CRM services also provide a file sharing function for storing, editing, updating, and referring to files, which are shared by users. Examples thereof include Salesforce.com, which provides the microblogging function called Chatter. It also provides Document and File as its file sharing functions.

Meanwhile, image processing apparatuses are becoming more and more multifunctional and sophisticated in functionality. In recent years, image processing apparatuses that have a network interface (hereinafter abbreviated as network I/F) as well as basic functions such as scanning and printing functions for converting paper documents into electronic ones, have been developed. For example, in the image processing apparatuses having a network I/F, electronic files formed by scanning paper documents can be transmitted to the above-mentioned cloud document management service which can store such documents therein. It is also possible to transmit the electronic files to any desired destination by attaching the files to an e-mail, for example.

Japanese Patent Laid-Open No. 2000-10922 proposes a technique in which a server performs processing based on an instruction from the client side. More specifically, a file in which an execute command is described is transmitted from a client terminal to an FTP folder, a server detects the transmission of the file from the client terminal, and runs a job by executing the command described in the file.

However, the conventional technique has the following problem. In the above-described conventional technique, for example, image data obtained by scanning an original document cannot be distributed to users with the microblogging function provided in a cloud service in an environment where the users are doing business operations using the microblogging function. Furthermore, in the above-described conventional technique, if image data is transmitted from an image processing apparatus, an operator needs to be aware of and select the destinations. For example, when scanning and distributing meeting materials or minutes, an operator has to select e-mail addresses of all members on the image processing apparatus. For that reason, operator's operations become complicated, or errors occur because some destinations are missed or materials are transmitted to unnecessary destinations. Moreover, an operator needs to determine an appropriate distribution mode depending on the combination of members of the destination. For example, when distributing materials by transmitting them to a folder on the document management service, an operator can complete the operation for distribution to all members only after selecting the folder for which all members have permission to access.

SUMMARY OF INVENTION

The present invention enables realization of a system capable of reducing an operator's time and effort in image data distribution.

One aspect of the present invention provides an image processing apparatus capable of communicating with a server that provides a microblogging function for publicizing a message registered by a user to another user, comprising: data storage means for storing image data; registration means for registering a first message with the server if image data is stored in the data storage means; monitoring means for monitoring a second message that is newly registered with respect to the first message registered by the registration means; analysis means for analyzing the second message if the monitoring means detect the second message; and transmission means for transmitting the image data stored in the data storage means based on a result of analysis by the analysis means.

Another aspect of the present invention provides a method for controlling an image processing apparatus capable of communicating a server that provides a microblogging function for publicizing a message registered by a user to another user and including data storage means for storing image data, the method comprising: Registering, by registration means, a first message with the server if image data is stored in the data storage means; monitoring, by monitoring means, a second message that is newly registered with respect to the first message registered during registering; analyzing, by analysis means, the second message if the second message is detected during monitoring; and transmitting, by transmission means, image data stored in the data storage means based on a result of analysis during analyzing.

Still another aspect of the present invention provides a program for causing a computer to execute each step in the method for controlling the image processing apparatus.

Further features of the present invention will become apparent from the following description of exemplary embodiments with reference to the attached drawings.

BRIEF DESCRIPTION OF DRAWINGS

FIG. 2 is a block diagram showing a hardware configuration of an image processing apparatus.

FIG. 3 is a block diagram showing a hardware configuration of a cloud service server.

FIG. 4 is a diagram showing a software configuration of the image processing apparatus.

FIG. 5 is a diagram showing a software configuration of the cloud service server.

FIG. 6 is a diagram showing a software configuration of an e-mail server.

FIG. 12 is a diagram showing a scanned document management table in the image processing apparatus.

FIG. 13 is a diagram showing a command character string management table, a protocol character string management table, and a parameter character string management table.

DESCRIPTION OF EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of an Image Processing System

Figure 1:
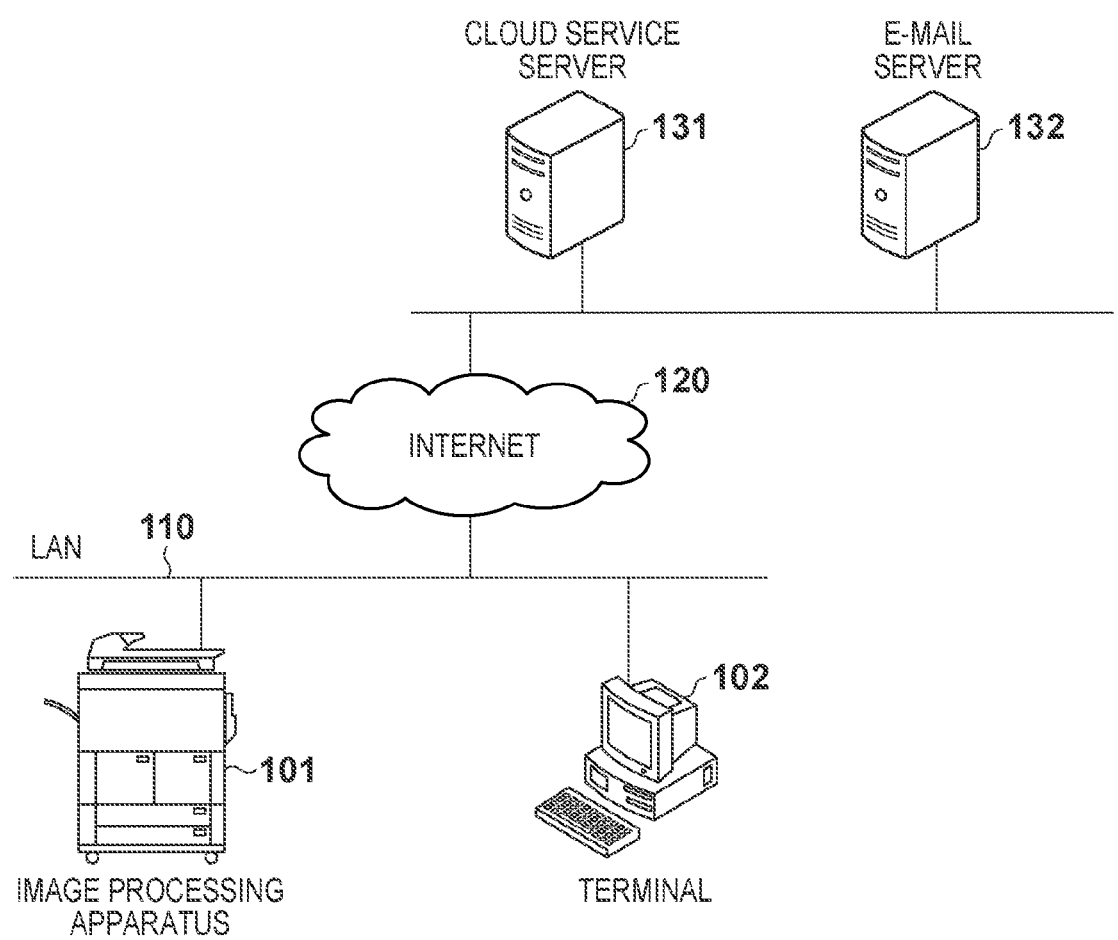
FIG. 1 is a diagram showing an entire configuration of an image processing system.

First, an exemplary configuration of an image processing system in the present embodiment is described with reference to FIG. 1. As shown in FIG. 1, the image processing system in the present embodiment includes an image processing apparatus 101, a terminal 102, a cloud service server 131, and an e-mail server 132. The image processing apparatus 101 and the terminal (personal computer: PC) 102 are communicably connected to a LAN 110. The LAN 110 is also communicably connected to the Internet 120, and, via the Internet 120, to the cloud service server 131 and the e-mail server 132 that provide services. The terminal 102, which is connected to the LAN 110 here, does not necessarily have to be connected thereto. For example, the terminal 102 only has to be connectable to the cloud service server 131 and the e-mail server 132.

Hardware Configuration of the Image Processing Apparatus

Next, the hardware configuration of the image processing apparatus 101 is described with reference to FIG. 2. The image processing apparatus 101 has a hardware configuration including a control unit 210, an operation unit 219, a printer 220, and a scanner 221. The control unit 210 includes a CPU 211, a ROM 212, a RAM 213, an HDD 214, an operation unit I/F 215, a printer I/F 216, a scanner I/F 217, and a network I/F 218.

The control unit 210 including the CPU 211 comprehensively controls the entire operations of the image processing apparatus 101. The CPU 211 reads out control programs stored in the ROM 212 and performs various controls such as read control and transmission control. The RAM 213 is used as a main memory of the CPU 211 and a temporary storage area such as a work area. The HDD 214 stores image data, various programs, or various information tables. The operation unit I/F 215 connects the operation unit 219 and the control unit 210. The operation unit 219 is provided with, for example, a liquid-crystal display unit with a touch panel function, a keyboard, and the like.

The printer I/F 216 connects the printer 220 and the control unit 210. Image data to be printed with the printer 220 is transferred via the printer I/F 216 from the control unit 210, and printed on a recording medium in the printer 220. The scanner I/F 217 connects the scanner 221 and the control unit 210. The scanner 221 reads an image on an original, outputs image data, and inputs the image data via the scanner I/F 217 to the control unit 210. The network I/F 218 connects the control unit 210 (image processing apparatus 101) to the LAN 110. The network I/F 218 transmits image data or information to an external device (e.g., cloud service server 131 and e-mail server 132) on the LAN 110, and receives various information from the external devices on the LAN 110.

Hardware Configurations of the Cloud Service Server, the E-Mail Server, and the Terminal Next, an exemplary configuration of the cloud service server 131 is described with reference to FIG. 3. Note that the description of hardware configurations of the e-mail server 132 and the terminal 102, which are similar to that of the cloud service server 131, is omitted. The control unit 310 including the CPU 311 comprehensively controls the entire operations of the cloud service server 131. The CPU 311 reads out control programs stored in the ROM 312 and performs various kinds of control processing. The RAM 313 is used as a main memory of the CPU 311 and a temporary storage area such as a work area. The HDD 314 stores image data, various programs, or various information tables described later. The network I/F 315 connects the control unit 310 (cloud service server 131) to the Internet 120. The network I/F 315 transmits and receives various information to and from other apparatuses on the LAN 110. Note that the network I/F of the terminal 102 connects the terminal 102 to the LAN 110.

Software Configuration of the Image Processing Apparatus

Next, the software configuration of the image processing apparatus 101 is described with reference to FIG. 4. The functional units shown in FIG. 4 are implemented by the CPU 211 in the image processing apparatus 101 reading out control programs from the ROM 212 or the HDD 214 into the RAM 213 and executing those programs. The image processing apparatus 101 has a software configuration including a screen display unit 400, a communication unit 401, a microblogging communication managing unit 402, a scan data managing unit 403, a job processing unit 404, a scan data database 405, and an image processing unit 406. The scan data database 405 is hereinafter abbreviated as the scan data DB 405.

The screen display unit 400 displays a screen for executing a scan operation to the control unit 219 and instructs the job processing unit 404 to run a scan job in response to a user instruction. The communication unit 401 transmits a request to the cloud service server 131 and the e-mail server 132 in response to an instruction from the microblogging communication managing unit 402. The communication unit 401 also receives a response (reply to the request) from the cloud service server 131 and the e-mail server 132.

The microblogging communication managing unit 402, upon detecting that scan data has been stored in the scan data DB 405 in response to notification from the job processing unit 404, transmits to the cloud service server 131 a message including a statement for notifying that scan data has been stored. Here, the statements for notifying that scan data has been stored are statements such as "Scan data is ready", which a person can understand. The microblogging communication managing unit 402 also manages transmitted messages.

The scan data managing unit 403 instructs the scan data DB 405 to store scan data generated at the job processing unit 404, and acquires scan data stored in the scan data DB 405. The job processing unit 404 requests execution of scan processing from the control unit 210 in response to an instruction to run a scan job given from an operator via the screen display unit 400, and receives, as a result thereof, image data generated by the scanner 221 reading an image on an original. Then, the job processing unit 404 notifies the scan data managing unit 403 that the image data is ready to be stored as scan data in the scan data DB 405. The scan data DB 405 stores, in response to an instruction from the scan data managing unit 403, the scan data generated at the job processing unit 404 in a memory (data storing means) such as the HDD 214, and acquires the stored scan data and transmits it to the scan data managing unit 403. The image processing unit 406 performs correction, processing, editing, resolution conversion, and the like, on input image data. In addition, it also performs rotation of image data and compression and expansion of data in JPEG, MMR, or another format. It also performs conversion into an electronic file format such as PDF, XPS, and OCXML.

Software Configuration of the Cloud Service Server

Next, the software configuration of the cloud service server 131 is described with reference to FIG. 5. The functional units shown in FIG. 5 are implemented by the CPU 311 in the cloud service server 131 reading out control programs from the ROM 312 or the HDD 314 into the RAM 313 and executing those programs.

The cloud service server 131 has a Web application 501 and a message database 502 (hereinafter abbreviated as message DB 502). The Web application 501 is a Web application for providing a CRM (Customer Relationship Management) service or the like. In the present embodiment, it is assumed that the Web application 501 provides a microblogging function. The Web application 501 includes a communication unit 511, a control unit 512, and a message managing unit 513.

The communication unit 511 receives a request from the image processing apparatus 101 and the terminal 102 such as a PC, and transmits the request content to the control unit 512. It further receives from the control unit 512 a processing result with respect to the request, creates response data for the request, and transmits the response to the image processing apparatus 101 or the terminal 102. The control unit 512 extracts a message or comment contained in the request in accordance with the request content transmitted from the communication unit 511, and requests registration of the message or comment from the message managing unit 513. The message managing unit 513 receives the message or comment transmitted from the control unit 512 and stores it in the message DB 502. The message managing unit 513 also acquires, in response to a request from the control unit 512, the message or comment registered by the message DB 502, and transmits it to the control unit 512.

Software Configuration of the E-Mail Server

Next, the software configuration of the e-mail server 132 is described with reference to FIG. 6. The functional units shown in FIG. 6 are implemented by the CPU 311 in the e-mail server 132 reading out control programs from the ROM 312 or the HDD 314 into the RAM 313 and executing those programs.

The e-mail server 132 includes an e-mail service 601 and an e-mail data database 602 (hereinafter abbreviated as e-mail data DB 602). The e-mail service 601 provides an e-mail service based on protocols such as SMTP (Simple Mail Transfer Protocol), POP (Post Office Protocol), and IMAP (Internet Message Access Protocol). The e-mail service 601 includes a communication unit 611, a control unit 612, and an e-mail management unit 613.

The communication unit 611 receives a request from the image processing apparatus 101 or the terminal 102 such as a PC, and transmits the request content to the control unit 612. It also receives from the control unit 612 a processing result with respect to the request, creates response data for the request, and transmits the response to the image processing apparatus 101 or the terminal 102. The control unit 612 requests, from the e-mail managing unit 613, processing such as storage, deletion, or movement of transmitted e-mails and acquisition of a list of managed e-mails in accordance with the request content transmitted from the communication unit 611. The e-mail managing unit 613 accesses the e-mail data DB 602 in response to the processing request transmitted from the control unit 612, performs storage, deletion, movement of transmitted e-mails or acquisition of the list of managed e-mails, and transmits a processing result to the control unit 612.

Microblogging Function

Figure 7:
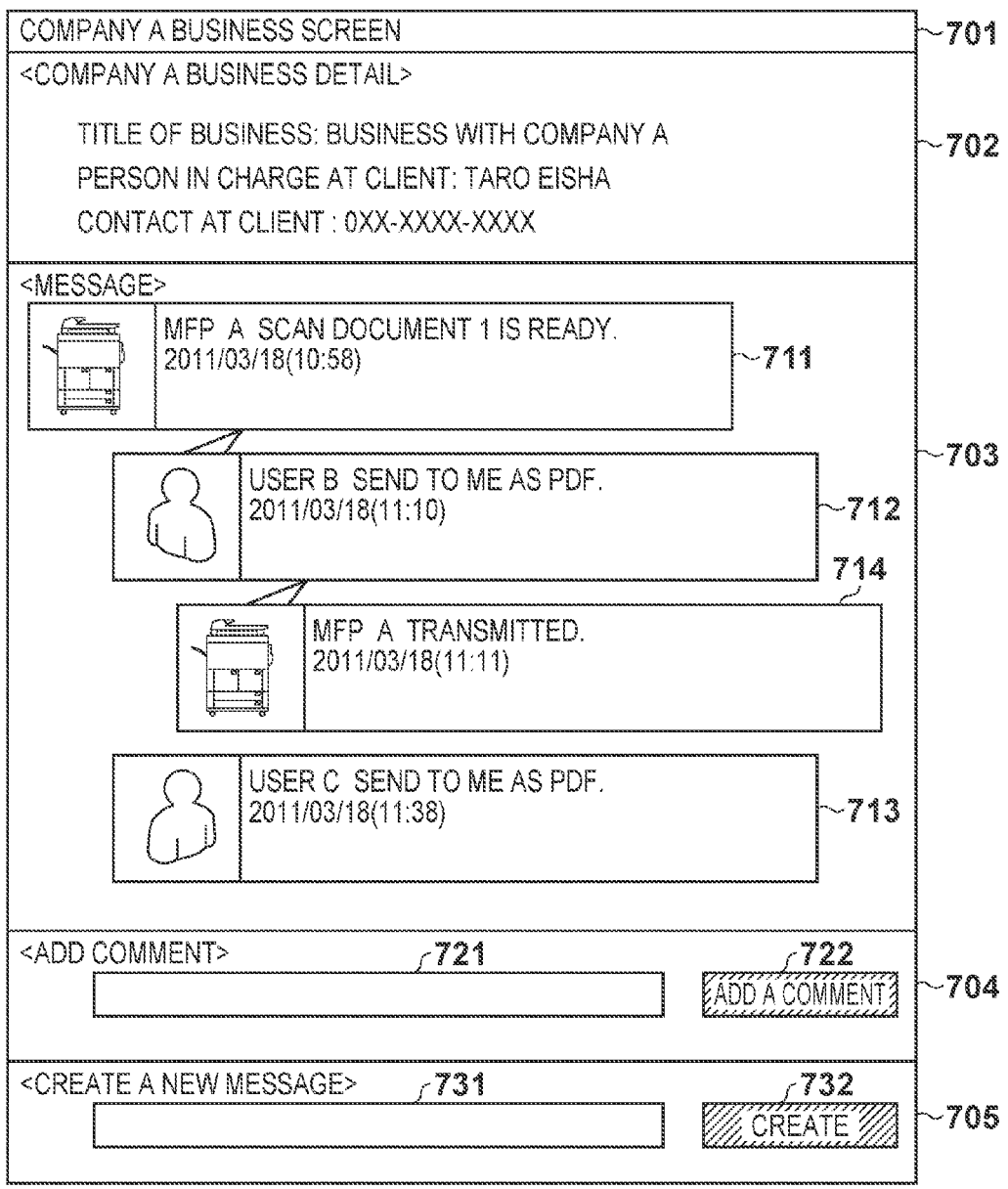
FIG. 7 is a view depicting a microblogging function.

Next, the microblogging function provided by the cloud service server 131 in the present embodiment is described with reference to FIG. 7. The microblogging function refers to a function of publicizing, to a plurality of other apparatuses, a message registered from apparatuses communicably connected to the cloud service server 131, and generally, the number of characters that can be used in the message is as small as 150 to 200. FIG. 7 is an exemplary screen of a Web page displayed when accessing the cloud service server 131 from a Web browser that works on the terminal 102 such as a PC. It is assumed here that the cloud service server 131 manages, for the purpose of sales support, information on business that is currently in progress.

Reference numeral 701 represents a company A business screen 701 that displays information about the company A's business provided by the cloud service server 131 to the terminal 102. The terminal 102 displays the company A business screen 701 on the display unit in accordance with screen information received from the cloud service server 131. Reference numeral 702 represents a business detail area 702 that displays information associated with the business, including the title of the business, the person in charge at the company, contact at the company, and the like. Reference numeral 703 represents a message display area, where the timeline constituted from messages and comments thereto is displayed. Reference numeral 703 shows the state where the MFP-A registers a message 711 "The AA meeting minutes are ready." and a user B responds to the message 711 with a comment 712 "Send to me as PDF". Further, it shows the state where the MFP-A responds with a processing result comment 714 according to the present embodiment. Similarly, a comment 713 indicates the state where a user C replies with a comment.

Reference numeral 704 represents a comment input section, where an operator of the terminal 102 inputs a comment in a comment input box 721 and presses an "add" button 722, thereby transmitting a comment added request from the Web browser to the cloud service server 131. The cloud service server 131, upon receiving the request, registers the input comment. Thus, when a user accesses the cloud service server 131 on the Web browser, comments registered on the Web browser are displayed as shown with the above-mentioned comments 712 and 713.

Reference numeral 705 represents a message input section, where an operator of the terminal 102 inputs a message in a message input box 731 and presses a "create" button 732, thereby transmitting a message create request from the Web browser to the cloud service server 131. The cloud service server 131, upon receiving the request, registers the input message. Thus, when a user accesses the cloud service server 131 on the Web browser, messages created on the Web browser are displayed as shown with the above-mentioned message 711.

Figure 8:
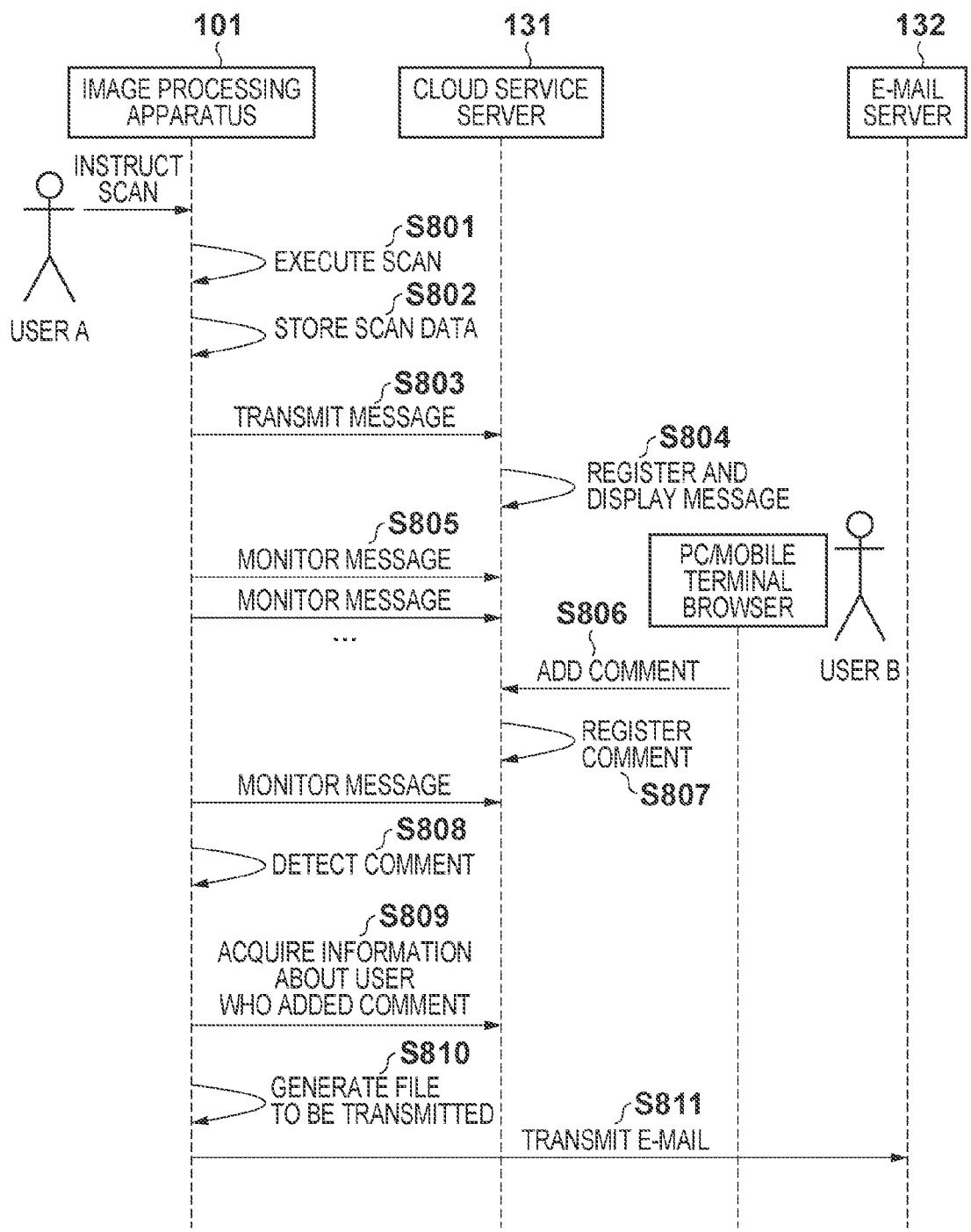
FIG. 8 is a sequence diagram depicting an operation in the execution of a set of processing.

Processing Sequence of Comment Monitoring and Transmission Instruction Functions Next, an operation of a set of processing performed by the image processing apparatus 101, the cloud service server 131, and the e-mail server 132 in the present embodiment is described with reference to FIG. 8. The detailed processing flowchart in the image processing apparatus 101 will be described later with reference to FIGS. 9 to 11.

At S801, the image processing apparatus 101 performs scan processing with the scanner 221 in response to a user instruction. In the scan processing, the scanner 221 scans an image on an original paper document and acquires image data to be output. At S802, the image processing apparatus 101 stores the above-acquired image data as scan data in the scan data DB 405 in the image processing apparatus 101. Subsequently, at S803, the image processing apparatus 101 transmits a message (first message) "The scanned document is ready." to the cloud service server 131.

At S804, the cloud service server 131 receives the message transmitted from the image processing apparatus 101, and performs control for registering this message with the message DB 502 and displaying the message on the display screen. In other words, when accessed by the image processing apparatus 101 or the terminal 102, the message is added to the screen information corresponding to a screen displayed on a display unit in each apparatus. Note that if a new comment (second message) is registered from another apparatus with respect to the registered message, the content of the new comment is added to the above-mentioned screen information. Accordingly, the image processing apparatus 101 can monitor whether or not any comment has been added to the message registered with the cloud service server 131. For this purpose, at S805, the image processing apparatus 101 transmits a request and checks with the cloud service server 131 whether or not any additional comment exits. As shown in FIG. 8, the image processing apparatus 101 preferably checks additional comments on a regular basis.

Here, it is assumed that a user B who operates the terminal 102 such as a PC or a mobile terminal accesses the cloud service server 131 using his/her own Web browser and checks the message registered at S803 by the image processing apparatus 101. When the user B wants to acquire the scan data after checking the message, he or she inputs a desired data format and a cloud storage service to which the data is transmitted in a comment input area 704 shown in FIG. 7. For example, the user B inputs a comment (second message) "Send to me as PDF".

When the user B presses the "add" button 722 after inputting the comment, at S806 the terminal 102 transmits a comment added request through the Web browser to the cloud service server 131. At S807, the cloud service server 131 receives the comment added request transmitted from the Web browser in the terminal 102 of the user B, and registers the content of the comment with the message DB 502. At S808, the image processing apparatus 101 detects, through the above-mentioned message monitoring at S805, that an added comment (second message) exists, and analyzes the added comment. The image processing apparatus 101 analyzes the detected comment: "Send to me as PDF", that is, the comment added by the terminal 102. More specifically, as analysis processing, information indicated by "Send", which is a transmission instruction, "me", which indicates information on a transmission protocol, and "PDF", which is the format of the file to be transmitted, is acquired from the content of a request in the comment.

At S809, the image processing apparatus 101 acquires, from the cloud service server 131, information on the user who added the above comment, for example, the address of the terminal 102. Subsequently, at S810, the image processing apparatus 101 converts the scan data into a PDF file in accordance with the result of the above comment analysis. At S811, the image processing apparatus 101 transmits an e-mail to which the generated PFD file is attached to the e-mail server 132. Thus, the image processing apparatus 101 stores the scan data, and notifies, using the cloud service server 131, a plurality of users that the scanned document is ready. After that, the image processing apparatus 101 monitors comments registered with the cloud service server 131 from other users, thus detects and responds to a request made with respect to the scanned document from other users. For example, it responds to the request from other users for transmission of the stored scanned document in PDF format.

Image Reading and Message Transmission Processing

Next, the processing procedure of an image reading operation, message transmission, and comment monitoring of the image processing apparatus 101 in the present embodiment is described with reference to FIG. 9. The processing described below is implemented by the CPU 211 in the image processing apparatus 101 reading out control programs from the ROM 212 or the HDD 214 into the RAM 213 and executing those programs.

At S901, the image display unit 400 detects a scan execution instruction given by a user operation. Here, setting for reading an original and a document title of read electronic data can be configured. The settings for reading an original, such as settings of resolution, color mode, two-side reading, and the like, can be configured.

At S902, the image display unit 400 that has detected the scan execution instruction notifies the job processing unit 404 of the instruction to run a scan job. The job processing unit 404, upon receiving the instruction to run a scan job, requests execution of scan processing from the control unit 210. The control unit 210 causes, via the scanner I/F 217, the scanner 221 to execute a scan with the scan processing execution request. By the request of the control unit 210, the scanner 221 generates image data by reading out an image on an original and transmits the image data to the control unit 210 via the scanner I/F 217. The control unit 210, upon receiving the image data, transmits the received image data as a result of scan processing execution to the job processing unit 404.

At S903, the job processing unit 404 receives the image data, and notifies the scan data managing unit 403 that this image data is stored as scan data. The scan data managing unit 403, upon receiving the notification from the job processing unit 404, stores the image data as scan data in the scan data DB 405, and notifies the job processing unit 404 of completion of scan data storage. At the same time as storing scan data, it also stores scan data information in a scan data management table shown in FIG. 12.

Here, the scan data management table is described with reference to FIG. 12. The scan data management table stores scanned document IDs 1201, scanned document titles 1202, and message IDs 1203. The scanned document ID 1201 entries store IDs that are generated in the scan data management table and are different from each other. The scanned document title 1202 entries store character strings of document titles configured at S901 above. Here, the scan data is held in a data format used internally in the image processing apparatus 101 and formed with a compression method that presumes printing. The message ID 1203 entries store message IDs assigned by the cloud service server 131 for identifying messages contained in the scan data information. For example, a row 1204 indicates that the data has the scanned document ID 1201 of "0001", the scanned document title 1202 of "AA meeting minutes", and the message ID 1203 of "147051".

Figure 9:
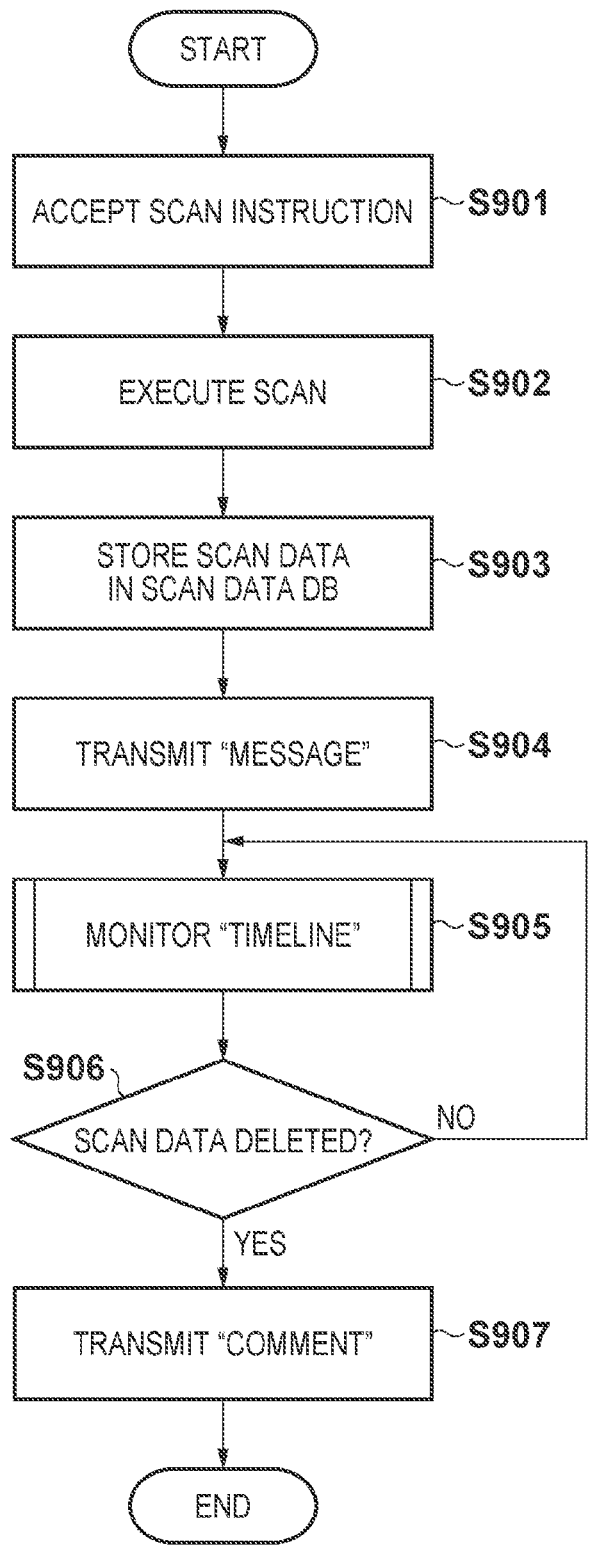
FIG. 9 is a flowchart illustrating a processing procedure from an image reading operation, to message transmission, and to comment monitoring in the image processing apparatus.

Here we return to the description of FIG. 9. At S904, the job processing unit 404 receives the notification of completion of scan data storage, and requests message transmission from the microblogging communication managing unit 402. The microblogging communication managing unit 402, upon receiving the request from the job processing unit 404, creates a message with the content "The AA meeting minutes are ready.", and transmits a message transmission request and the message to the communication unit 401. Here, information such as a document title, with which a user can determine what kind of document has been scanned, is transmitted as the message. The communication unit 401 that has received a message transmission request from the microblogging communication managing unit 402 transmits the received message to the cloud service server 131. The message transmission to the cloud service server 131 causes a message to be registered on the microblogging function provided by the cloud service server 131. The communication unit 401 responds to the microblogging communication managing unit 402 with information on a result of completed registration of the message received from the cloud service server 131. The microblogging communication managing unit 402 notifies the scan data managing unit 403 of a message ID acquired from the completed message registration result information. The scan data managing unit 403 stores the message ID as the message ID 1203 of the scan data information registered at S903 above.

Thus, a "timeline" for the message is created in the microblogging function provided by the cloud service server 131. When a user accesses the cloud service server 131 using a Web browser or the like, messages as shown in FIG. 7 are displayed, thereby enabling communication with other users through exchange of messages or comments.

Next, at S905, the CPU 211 monitors the "timeline" of the above-registered message as explained for S805 above. The monitoring method will be described later using FIG. 10. Subsequently, at S906, the scan data managing unit 403 determines, in accordance with a user instruction, whether or not the scan data has been deleted. If the scan data has been deleted, it notifies the microblogging communication managing unit 402 of completed deletion, and proceeds to S907. Meanwhile, if the scan data has not been deleted, it returns to S905 and continues timeline monitoring processing.

At S907, the microblogging communication managing unit 402, upon receiving a request from the scan data managing unit 403, creates a message with the content "The AA meeting minutes have been deleted.", and transmits a message transmission request and the message to the communication unit 401. The communication unit 401, upon receiving the message transmission request from the microblogging communication managing unit 402, transmits the received message to the cloud service server 131. The message transmission to the cloud service server 131 causes the message to be registered on the microblogging function provided by the cloud service server 131. Thus, a user is aware of the state where the document has already been deleted and cannot be acquired when accessing the cloud service server 131 using a Web browser or the like.

Comment Monitoring Processing

Figure 10:
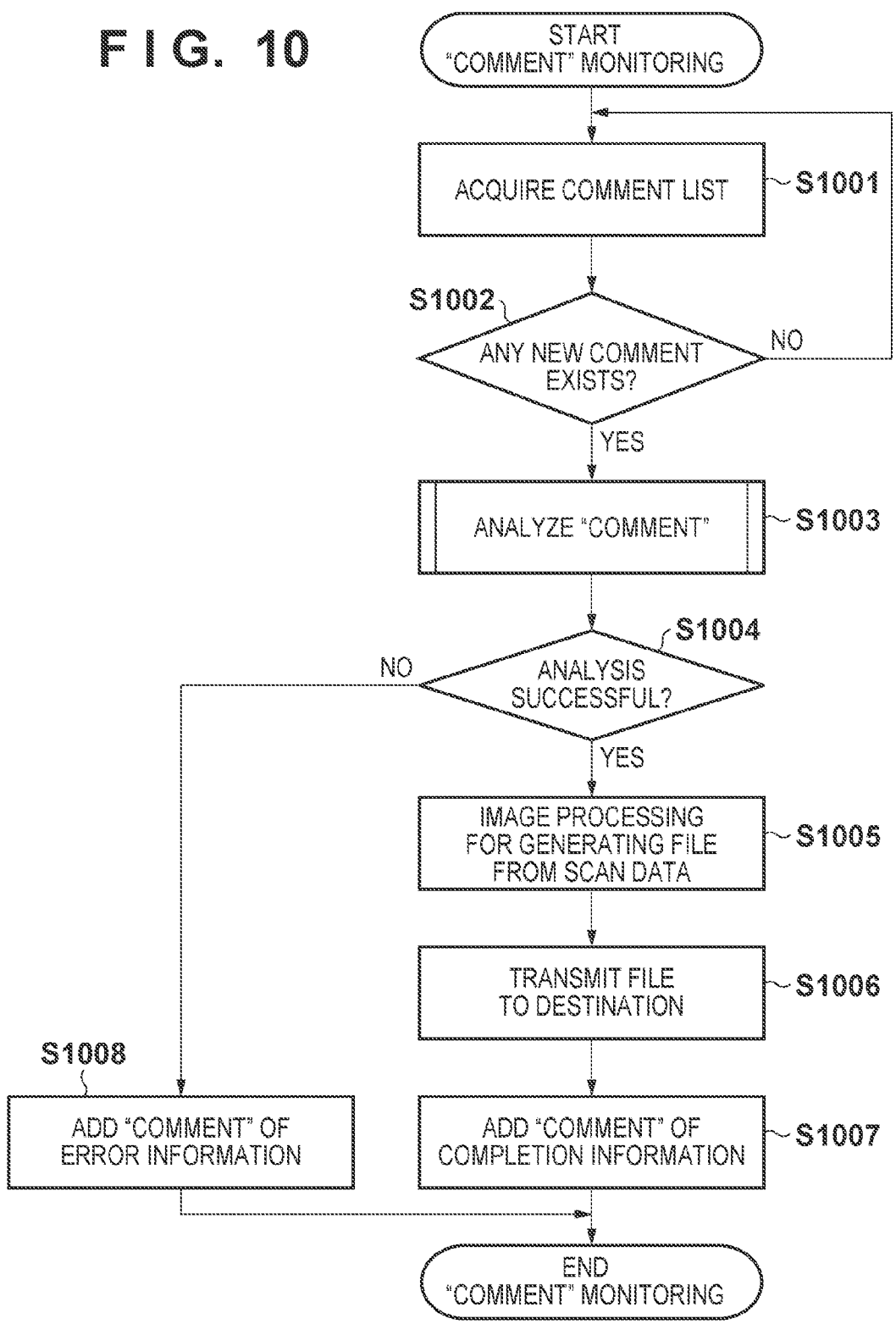
FIG. 10 is a flowchart illustrating a procedure of comment monitoring processing in the image processing apparatus.

Next, the detail of comment monitoring processing (S805 and S905) of the image processing apparatus 101 in the present embodiment is described with reference to FIG. 10. The processing described below is implemented by the CPU 211 in the image processing apparatus 101 reading out control programs from the ROM 212 or the HDD 214 into the RAM 213 and executing those programs.

At S1001, the microblogging communication managing unit 402 acquires information on a list of comments to the message registered at S904 above from the cloud service server 131 via the communication unit 401. Subsequently, at S1002, the CPU 211 determines whether or not any new comment has been added to the message. If a new comment exists, it proceeds to S1003, and if not, it returns to S1001 and regularly checks whether or not any new comment has been added.

Whether or not any new comment has been added is determined based on whether a user who made a sub-comment for each comment is the user specified for the image processing apparatus 101. For example, in the case of FIG. 7, the comments 712 and 713 can be acquired as a list in the comment list for the message 711. Further, after acquiring the comment 712, the comment 714 can also be acquired. User information about this comment 714 indicates the user of the image processing apparatus 101. Accordingly, at S1002, it can be determined that the comment 714 is not a new comment. Meanwhile, the comment 713, which is not associated with any other comments, can be determined as a new comment. Processing of transmission of comments, such as the comment 714, by the image processing apparatus 101 will be described later.

At S1003, the CPU 211 analyzes the new comment acquired at S1002 above, perceives the instruction from the user of the comment, and performs subsequent processing. The comment analysis processing will be described later using FIG. 11. Subsequently, at S1004, the CPU 211 determines whether or not the analysis processing at S1003 has been successful. If the analysis processing has been successful, it proceeds to S1005, and if not, it proceeds to S1008.

At S1005, the CPU 211 instructs the image processing unit 406 to convert the file format. The file format used in the conversion is determined in accordance with the result of the comment analysis processing at S1003 above. The image processing unit 406 acquires, via the scan data managing unit 403, the scan data stored at S903 above, and converts the file format. Here, the scan data is specified by searching the scan data information management table for the scan data corresponding to the message ID stored at S903.

At S1006, the CPU 211 instructs the communication unit 401 to transmit the electronic file generated at S1005 above. The destination of transmission is determined in accordance with the result of the comment analysis processing at S1003 above. The communication unit 401 acquires the electronic file from the image processing unit 406, and transmits an e-mail to which the electronic file is attached to the e-mail server 132. Thus, the image-processed electronic file can be transmitted to the user who transmitted the comment. Alternatively, in addition to e-mail transmission, the file can also be transmitted to the file sharing function provided by the cloud service server 131 in accordance with the result of the comment analysis processing at S1003 above.

When the file is transmitted, at S1007, the microblogging communication managing unit 402 creates a message with the content "Transmitted." via the communication unit 401, transmits the comment, and terminates the processing. Thus, a user who transmitted the comment can be notified of completion of the processing via the cloud service server 131. For example, in the case of FIG. 7, the comment 714 is the comment transmitted at this step. At the same time, at S1002, whether or not any comment has been added can be determined by acquiring the comment added at this step.

At S1008, since the analysis processing has failed at S1003, the microblogging communication managing unit 402 creates a message with the content "Transmission failed." via the communication unit 401, and transmits the comment. Thus, the user who transmitted the comment can be notified of the failure of processing. At the same time, at S1002, whether or not any comment has been added can be determined by acquiring the comment added at this step. Further, a user can also make a comment on this time line for the purpose other than control of the image processing apparatus 101. In the comment analysis processing at S1003, the error comment may be set to be not transmitted only when any command character string cannot be searched.

Comment Analysis Processing

Figure 11:
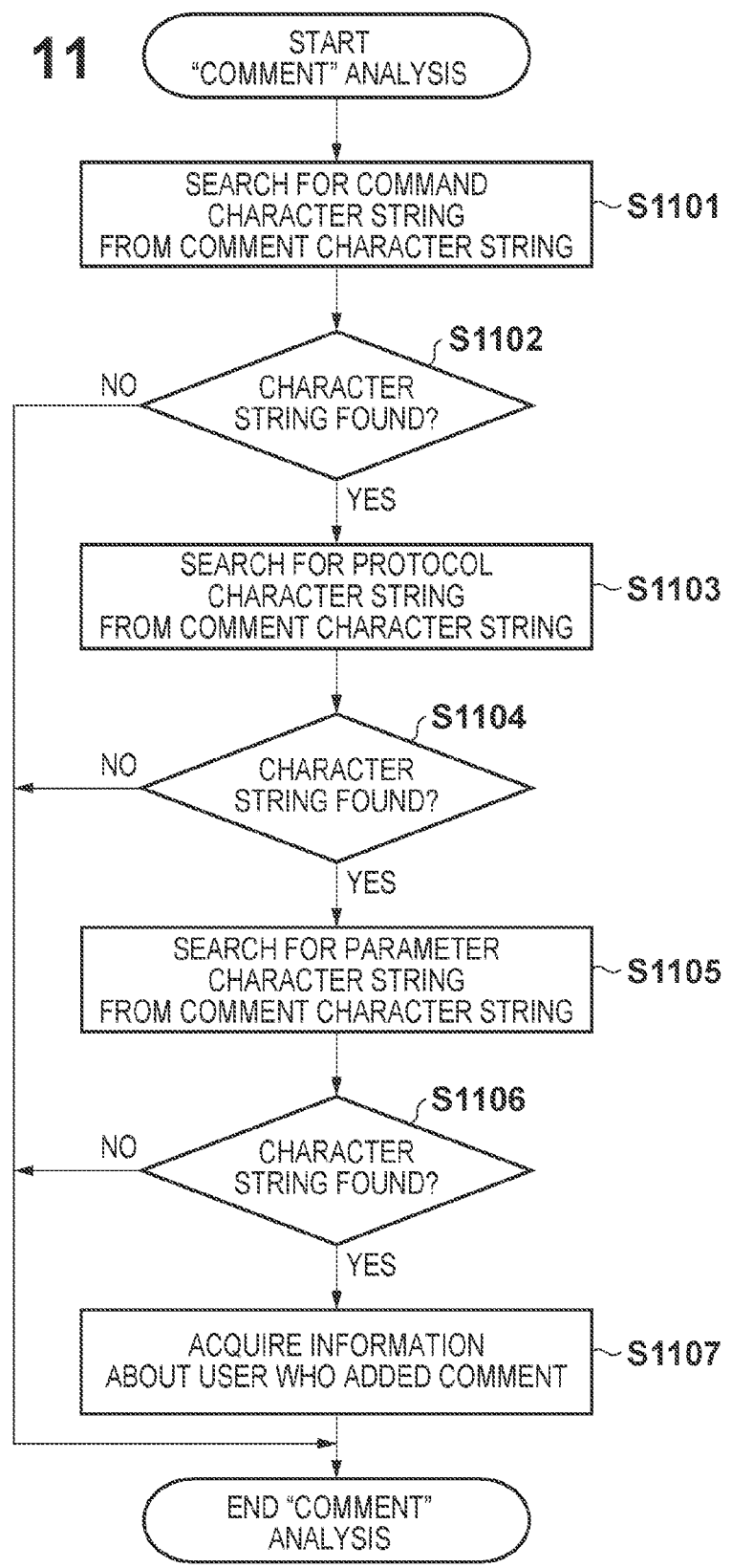
FIG. 11 is a flowchart illustrating a procedure of comment analysis processing in the image processing apparatus.

Next, the detail of comment analysis processing (S808 and S1003) of the image processing apparatus 101 in the present embodiment is described with reference to FIG. 11. The processing described below is implemented by the CPU 211 in the image processing apparatus 101 reading out control programs from the ROM 212 or the HDD 214 into the RAM 213 and executing those programs. In this flowchart, the microblogging communication managing unit 402 analyzes the new comment detected at S1002 above. It is assumed that the comment is in the following format: "Send to me as PDF". From the above comment, the microblogging communication managing unit 402 specifies the e-mail server 132 that is the destination of image data transmission, the user of the e-mail server 132 with which the transmitted image data is shared, and the data format of the transmitted image data.

At S1101, the microblogging communication managing unit 402 searches for command character strings included in a command character string management table 1300 shown in FIG. 13 from the comment character string. In the command character string management table 1300, the command character strings 1301 and processing functions 1302 are defined in association with each other. For example, "send" is defined as indicating a transmitting function, and "print" is defined as indicating a printing function. Subsequently, at S1102, the CPU 211 determines, in accordance with the result of S1101 above, whether or not to continue this flowchart. If any command character string is found at S1101 above, it proceeds to S1103, and if not, the comment cannot be handled and the processing terminates due to error. In the above exemplary comment, the command character string "send" can be searched, and the processing function can be determined as the transmitting function.

Next, at S1103, the microblogging communication managing unit 402 searches for protocol character strings included in a protocol character string management table 1310 from the comment character string. In the protocol character string management table 1310, the protocol character strings 1311 and processing functions 1312 are defined in association with each other. For example, "me" is defined as indicating an e-mail transmitting function, and "document" is defined as indicating a storage function of storing data in the cloud service server 131. Subsequently, at S1104, the CPU 211 determines, in accordance with the result of S1103 above, whether or not to continue this flowchart. If a protocol character string is found at S1103, it proceeds to S1105. Meanwhile, if no protocol character string can be found at S1103 above, the comment cannot be handled and the processing terminates due to error. In the above exemplary comment, the protocol character string "me" can be searched, and the processing function can be determined as the e-mail transmitting function. In this example, it is defined that if the character string "me" is included, e-mail is used as a protocol for transmitting image data. However, "me" is originally a character string indicating that the user who registered the new comment is specified as the destination of transmission, and the protocol used for transmission is not limited to e-mail. Further, by replacing "me" with the name of a specific user (e.g., a friend of the user who registered the new comment), this specific user can also be set as the destination to which image data is transmitted.

Next, at S1105, the microblogging communication managing unit 402 searches for parameter character strings included in a parameter character string management table 1320 from the comment character string. In the parameter character string management table 1320, the parameter character strings 1321 and processing functions 1322 are defined in association with each other. For example, "pdf" is defined as indicating PDF conversion processing, and "jpeg" is defined as indicating JPEG conversion processing. Subsequently, at S1106, the CPU 211 determines, in accordance with the result of S1105 above, whether or not to continue this flowchart. If any parameter character string is found at S1105, it proceeds to S1107. Meanwhile, if no parameter character string can be found at S1105 above, the comment cannot be handled and the processing terminates due to error. In the above exemplary comment, the parameter character string "PDF" can be searched, and the processing function can be determined as the PDF conversion processing. Note that the command character string management table 1300, the protocol character string management table 1310, and the parameter character string management table 1320 are examples of the character string tables, and stored in advance in a memory (character string table storing means) such as the HDD 214.

Next, at S1107, the CPU 211 acquires destination information for the processing functions found at S1103 above. The microblogging communication managing unit 402 transmits a comment ID to the cloud service server 131 and acquires user information on the user who transmitted the comment. The user information used in the microblogging function includes information that indicates the user's personal details. The personal details include, for example, a face picture, name, contact information (such as telephone number, e-mail address, and mailing address), organization to which a user belongs, language, and the like. With such information, a user can determine who communicates with the user on the microblogging function. Further, the microblogging function also has functions of grouping a plurality of users who share a common personal detail and changing the functions or information to be provided. The e-mail address contained in this user information is acquired as the destination, and the processing terminates. E-mail address input operation can be simplified by specifying the destination information from the user information.

As described above, in the image processing system in the present embodiment, a user can control the image processing apparatus by transmitting a comment on the microblogging function. In other words, a user who wants to distribute a paper document needs only to perform a scan operation with the image processing apparatus, and an operation such as selection of a distribution method or distribution destination is unnecessary. Furthermore, a user who needs an electronic file can actively acquire the necessary file and prevent other users who do not need the electronic file to acquire the file.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-128644 filed on Jun. 8, 2011, which is hereby incorporated by reference herein in its entirety.

The invention claimed is:

1. An image processing apparatus capable of communicating with a server that provides a microblogging function for publicizing a message registered by a user to another user, the apparatus comprising:
a data storage unit configured to store image data;
a registration unit configured to register a first message with the microblogging function provided by the server if the image data is stored in the data storage unit;
a monitoring unit configured to monitor a second message that is newly registered with the microblogging function as a comment to the first message registered by the registration unit;
an analysis unit configured to analyze a character string contained in the second message if the monitoring unit detects the second message; and
a transmission unit configured to transmit the image data stored in the data storage unit using a setting corresponding to a content of the character string contained in the second message analyzed by the analysis unit.

2. The image processing apparatus according to claim 1, further comprising a reading unit configured to read out an image from an original and outputting image data,
wherein the data storage unit stores the image data output by the reading unit.

3. The image processing apparatus according to claim 1, further comprising an acquisition unit configured to acquire user information about a user who has registered the second message,
wherein the transmission unit transmits the image data based on the user information acquired by the acquisition unit.

4. The image processing apparatus according to claim 3, wherein the acquisition unit acquires the user information from the server.

5. The image processing apparatus according to claim 1, wherein if transmission of the image data by the transmission unit is completed, the registration unit further registers with the server a message indicating that the transmission of the image data is completed.

6. The image processing apparatus according to claim 1, further comprising a determination unit configured to determine whether the image data stored in the data storage unit have been deleted,
wherein if the determination unit determines that the image data have been deleted from the data storage unit, the registration unit further registers with the server a message indicating that the image data have been deleted.

7. The image processing apparatus according to claim 1, further comprising a character string table storage unit configured to store a character string table that defines a predefined character string for analyzing the second message,
wherein the analysis unit analyzes the second message by searching for a character string stored in the character string table storage unit from the second message.

8. The image processing apparatus according to claim 7, wherein the character string table at least defines:
a command character string that indicates whether the image data is printed or transmitted;
a protocol character string that indicates, if the command character string indicates transmission of the image data, a method for transmitting the image data; and
a parameter character string that indicates a format of the image data.

9. The image processing apparatus according to claim 1, wherein the transmission unit transmits the image data by attaching the image data to an e-mail.

10. The image processing apparatus according to claim 1, wherein the transmission unit transmits the image data to the server.

11. A method for controlling an image processing apparatus capable of communicating with a server that provides a microblogging function for publicizing a message registered by a user to another user and including a data storage unit configured to store image data, the method comprising:
registering, by a registration unit, a first message with the microblogging function provided by the server if image data is stored in the data storage unit;
monitoring, by a monitoring unit, a second message that is newly registered with the microblogging function as a comment to the first message registered during the registering;
analyzing, by an analysis unit, a character string contained in the second message if the second message is detected during the monitoring; and transmitting, by a transmission unit, image data stored in the data storage unit using a setting corresponding to a content of the character string contained in the second message analyzed.

12. A non-transitory computer-readable storage medium storing a computer program that causes a computer to perform the method according to claim 11.

\* \* \* \* \*